(12) United States Patent
Masaoka

(10) Patent No.: US 10,199,845 B2
(45) Date of Patent: Feb. 5, 2019

(54) ELECTRONIC DEVICE

(71) Applicant: Panasonic Intellectual Property Management Co., Ltd., Osak-shi, Osaka (JP)

(72) Inventor: Satoru Masaoka, Osaka (JP)

(73) Assignee: Panasonic Intellectual Property Management Co,. Ltd., Osaka (JP)

( * ) Notice: Subject to any disclaimer, the term of this patent is extended or adjusted under 35 U.S.C. 154(b) by 0 days.

(21) Appl. No.: 15/648,123

(22) Filed: Jul. 12, 2017

(65) Prior Publication Data

US 2017/0310135 A1   Oct. 26, 2017

Related U.S. Application Data

(63) Continuation of application No. PCT/JP2016/000175, filed on Jan. 15, 2016.

(30) Foreign Application Priority Data

Jan. 16, 2015   (JP) .................................. 2015-007181

(51) Int. Cl.
   *G06F 1/16*      (2006.01)
   *G06F 1/26*      (2006.01)
   (Continued)

(52) U.S. Cl.
   CPC .......... *H02J 7/0047* (2013.01); *G06F 1/1635* (2013.01); *G06F 1/263* (2013.01);
   (Continued)

(58) Field of Classification Search
   CPC ........ H02J 7/0047; G06F 1/28; G06F 1/1635; G08B 5/36; G08B 21/182
   (Continued)

(56) References Cited

U.S. PATENT DOCUMENTS

2009/0284225 A1* 11/2009 Nakanuma ............ G06F 1/1626
                                                          320/134
2014/0055097 A1   2/2014 Nagai et al.
2014/0082394 A1   3/2014 Kitano et al.

FOREIGN PATENT DOCUMENTS

JP   2014-045530   3/2014
JP   2014-059619   4/2014

* cited by examiner

*Primary Examiner* — Steven Lim
*Assistant Examiner* — Mancil Littlejohn, Jr.
(74) *Attorney, Agent, or Firm* — Hamre, Schumann, Mueller & Larson, P.C.

(57) ABSTRACT

An electronic device includes an internal battery, a first battery, and a second battery. The device further includes a first latch for locking the first battery and a second latch for locking the second battery. The device further includes a latch state detector for determining whether each of the first and second latches are open or closed, and a remaining battery power detector for detecting the remaining power in each of the first battery, the second battery, and the internal battery. The device further includes an LED and an LED controller for controlling the on-off of the LED. The LED controller operates as follows when the first or second latch is determined to be opened. If at least one of the first battery, the second battery, and the internal battery can supply electric power to the electronic device, the LED controller lights the LED in a first ON state. If none of the first battery, the second battery, and the internal battery can supply electric power to the electronic device, the LED controller makes the LED light in a second ON state.

2 Claims, 7 Drawing Sheets

(51) Int. Cl.
*G06F 1/28* (2006.01)
*G08B 5/36* (2006.01)
*H02J 7/00* (2006.01)
*G08B 21/18* (2006.01)

(52) U.S. Cl.
CPC ............... *G06F 1/28* (2013.01); *G08B 5/36* (2013.01); *G08B 21/182* (2013.01); *H02J 7/0045* (2013.01); *H02J 7/0063* (2013.01); *H02J 7/0036* (2013.01); *H02J 2007/005* (2013.01)

(58) Field of Classification Search
USPC ........................................ 340/636.1
See application file for complete search history.

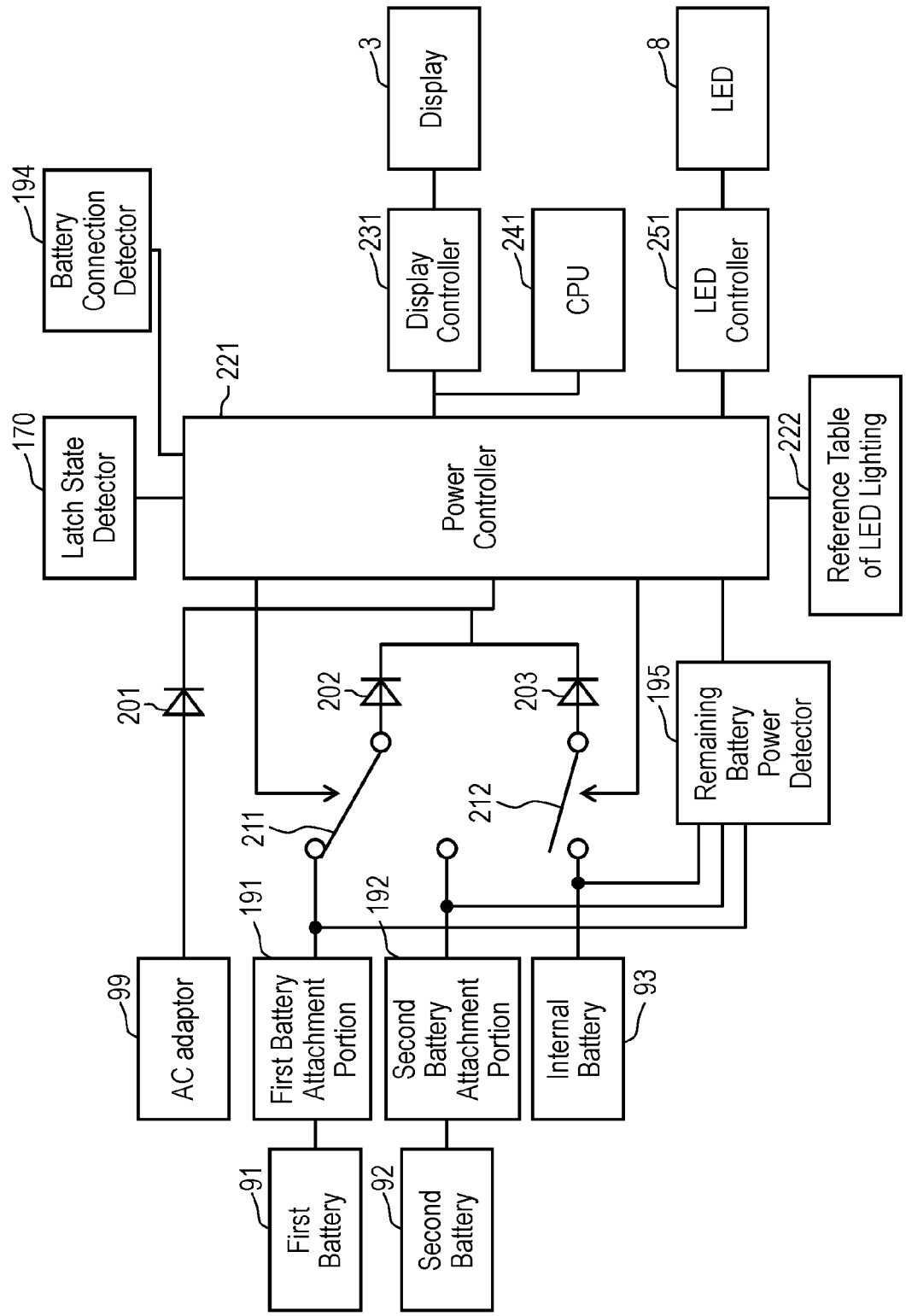

FIG. 6

| Internal Battery Information | 1st-Battery Information | 2nd-Battery Information | 1st-Latch Information | 2nd-Latch Information | 1st/2nd-Latch Information |
|---|---|---|---|---|---|
| No | No | No | Turn off | Turn off | Turn off |
| No | No | Yes | Continuous Green | Flashing Red | Flashing Red |
| No | Yes | No | Flashing Red | Continuous Green | Flashing Red |
| No | Yes | Yes | Continuous Green | Continuous Green | Flashing Red |
| Yes | No | No | Continuous Green | Continuous Green | Continuous Green |
| Yes | No | Yes | Continuous Green | Continuous Green | Continuous Green |
| Yes | Yes | No | Continuous Green | Continuous Green | Continuous Green |
| Yes | Yes | Yes | Continuous Green | Continuous Green | Continuous Green |

222a  222b  222c  222d  222e  222f

ELECTRONIC DEVICE

TECHNICAL FIELD

The present disclosure relates to an electronic device that can be powered by batteries.

BACKGROUND ART

Patent Literature 1 discloses an electronic device capable of carrying two batteries. This device includes on its back side an LED which is lit in a predetermined state to inform the user whether one of the two batteries is free to be detached.

CITATION LIST

Patent Literature

PTL 1: Japanese Unexamined Patent Application Publication No. 2014-059619

SUMMARY OF THE INVENTION

The electronic device according to the present disclosure includes: a first attachment portion to which a first battery is detachably attachable; a second attachment portion to which a second battery is detachably attachable; and an internal battery.

The device further includes: a first latch configured to lock the first battery attached on the first attachment portion; a second latch configured to lock the second battery attached on the second attachment portion; and a latch state detector configured to detect whether each of the first and second latches is open or closed.

The device further includes: a remaining battery power detector configured to determine the remaining power in each of the first battery, the second battery, and the internal battery; a light emitting diode; and a light-emitting-diode controller configured to control the on-off of the light emitting diode.

When the latch state detector determines that the first latch is opened, the light-emitting-diode controller operates as follows based on the determination results of the remaining battery power detector. If at least one of the second battery and the internal battery can supply electric power to the electronic device, the light-emitting-diode controller makes the light emitting diode light in the first ON state; and if neither the second battery nor the internal battery can supply electric power to the electronic device, the light-emitting-diode controller makes the light emitting diode light in the second ON state.

When the latch state detector determines that the second latch is opened, the light-emitting-diode controller operates as follows based on the determination results of the remaining battery power detector. If at least one of the first battery and the internal battery can supply electric power to the electronic device, the light-emitting-diode controller makes the light emitting diode light in the first ON state; and if neither the first battery nor the internal battery can supply electric power to the electronic device, the light-emitting-diode controller makes the light emitting diode light in the second ON state.

The electronic device according to the present disclosure can easily inform the user whether its battery is free to be detached while the device is in operation.

BRIEF DESCRIPTION OF DRAWINGS

FIG. 5 is a block diagram illustrating the structure of the electronic device according to the first exemplary embodiment.

FIG. 6 shows a reference table of LED lighting in the electronic device according to the first exemplary embodiment.

DESCRIPTION OF EMBODIMENT

An exemplary embodiment will be described in detail as follows with reference to the accompanying drawings. In the exemplary embodiment, the description of well-known matter and of substantially the same configuration as described earlier may be omitted to avoid redundancy and help those skilled in the art understand them easily.

Note that the inventors provide the attached drawings and the following description to make those skilled in the art fully understand the present disclosure, and do not intend to limit the claimed subject matter.

First Exemplary Embodiment

A first exemplary embodiment will be described as follows with reference to FIGS. 1 to 7.

1-1. Structure

Figure 1:
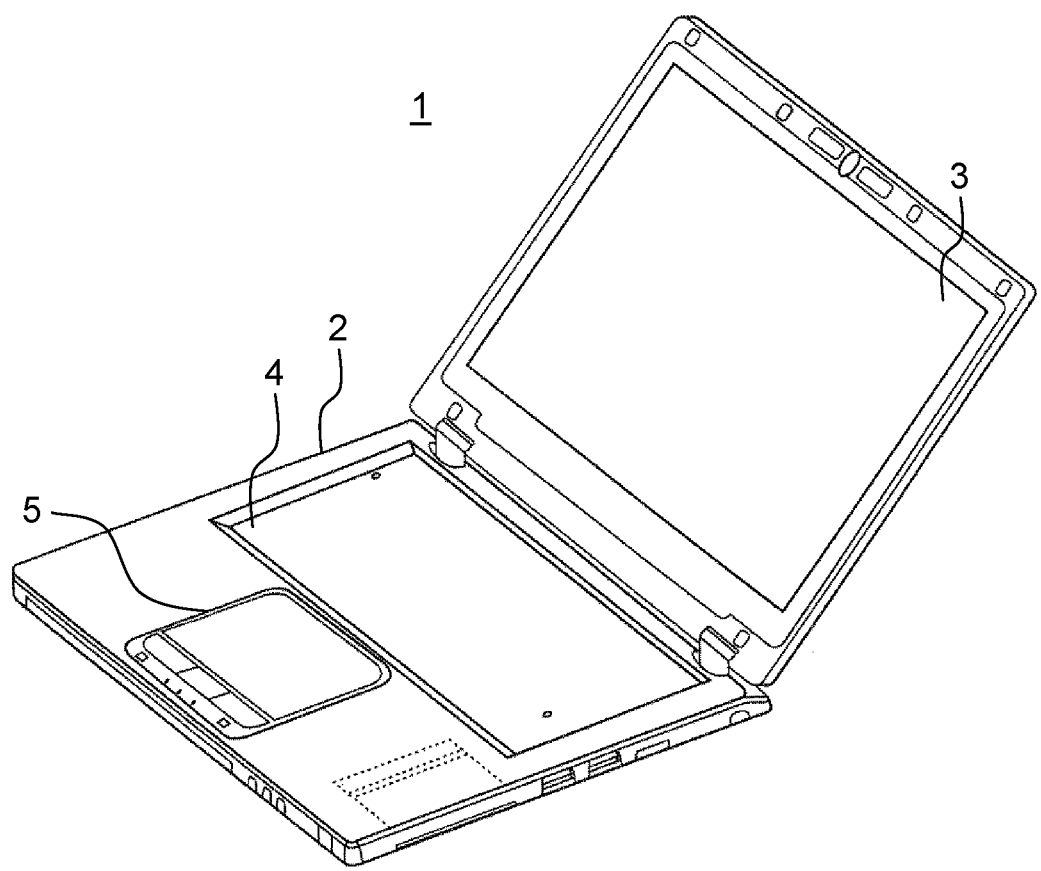
FIG. 1 is a perspective view of an electronic device according to a first exemplary embodiment.

FIG. 1 is a perspective view of electronic device 1 according to the first exemplary embodiment. As shown in FIG. 1, device 1 is a personal computer including the following: body 2; display 3 rotatably coupled to body 2 at an end of body 2; and keyboard 4 and pointing device 5, which are located on the upper surface of body 2. Device 1 further includes an unillustrated storage unit, which stores the operating system and various application software programs. Device 1 executes the operating system and the application software programs to provide the user with various functions.

Figure 2A:
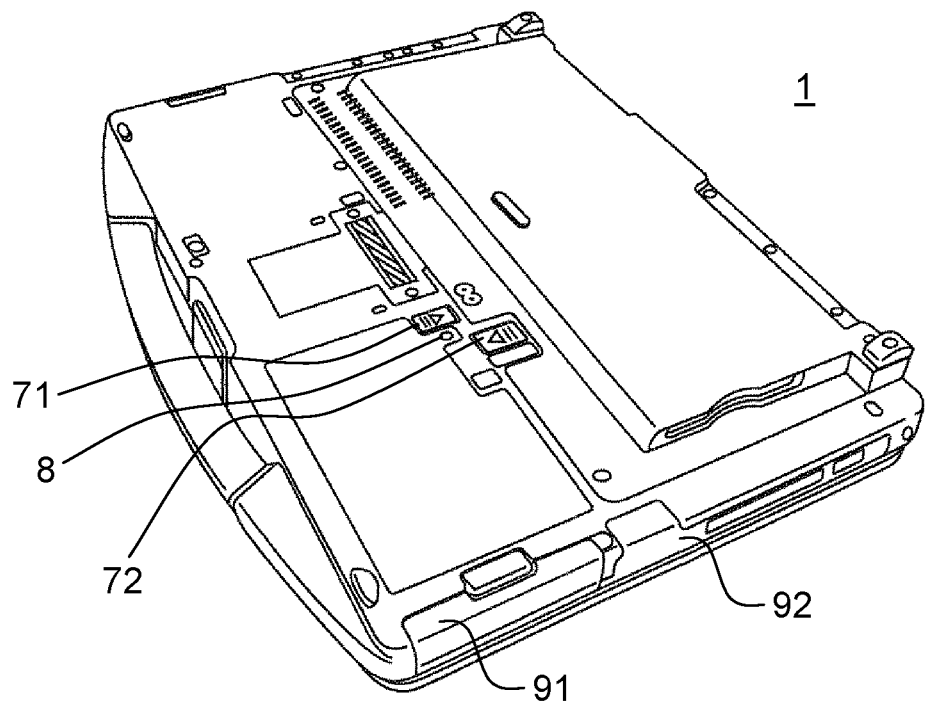
FIG. 2A is a perspective view of the bottom surface of the electronic device according to the first exemplary embodiment.

FIG. 2A is a perspective view of the bottom surface of device 1. Device 1 has, at a side of body 2, two slots into or from which first battery 91 and second battery 92 can be inserted or detached. Batteries 91 and 92 are secondary batteries easy to be attached and detached. As will be described later, device 1 further includes, inside of body 2, an internal battery (not shown), which is a built-in secondary battery. In short, device 1 can carry three secondary batteries: two detachable secondary batteries and one built-in secondary battery.

Figure 2B:
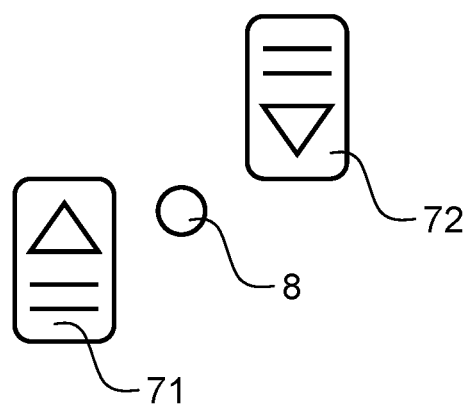
FIG. 2B shows a light emitting diode placed on the bottom surface of the electronic device according to the first exemplary embodiment.

FIG. 2B shows approximately the middle region of the bottom surface of device 1. In this region, there are provided first latch 71, light emitting diode (hereinafter, LED) 8, and second latch 72. First latch 71 locks first battery 91 when it is attached. Second latch 72 locks second battery 92 when it is attached. First latch 71 and second latch 72 are biased by springs or other similar device in body 2. Latches 71 and 72 are kept in the closed state unless the user applies a force in a direction to open first latch 71 or second latch 72. LED 8 is a light emitting element for informing the user whether at least one of first battery 91 and second battery 92 is free to be detached from device 1 while device 1 is in operation. In other words, LED 8 is a light emitting element for informing the user whether what is called the "hot swap" function is available. This function enables components to be replaced, attached, or detached while the device is active.

Figure 3A:
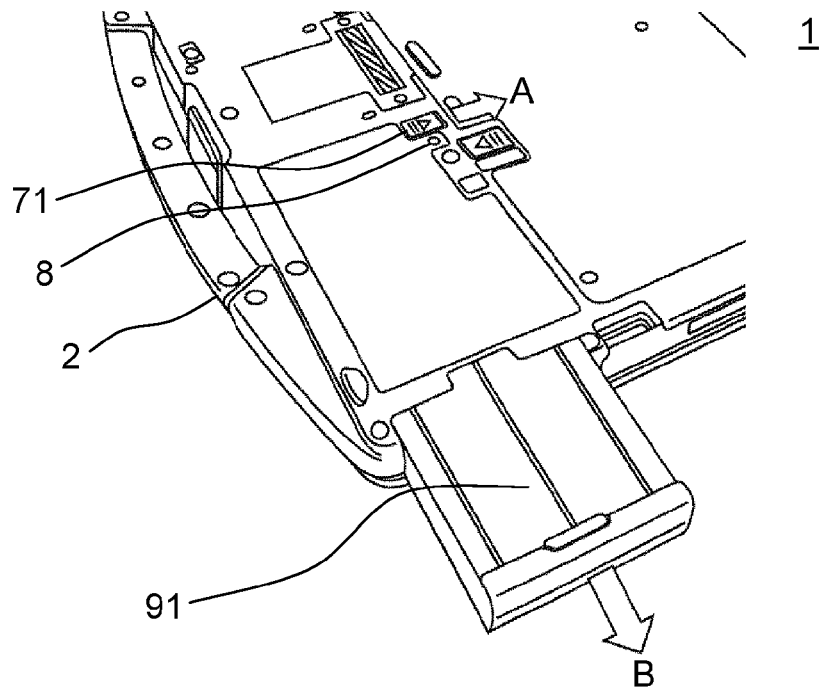
FIG. 3A shows how a first battery is detached from the electronic device according to the first exemplary embodiment.

FIG. 3A shows how first battery 91 is detached from device 1 according to the first exemplary embodiment. The user can easily detach first battery 91 from device 1 by sliding first latch 71 in the direction of the arrow A and then pulling first battery 91 out of body 2 in the direction of the arrow B while keeping first latch 71 in the open state.

Figure 3B:
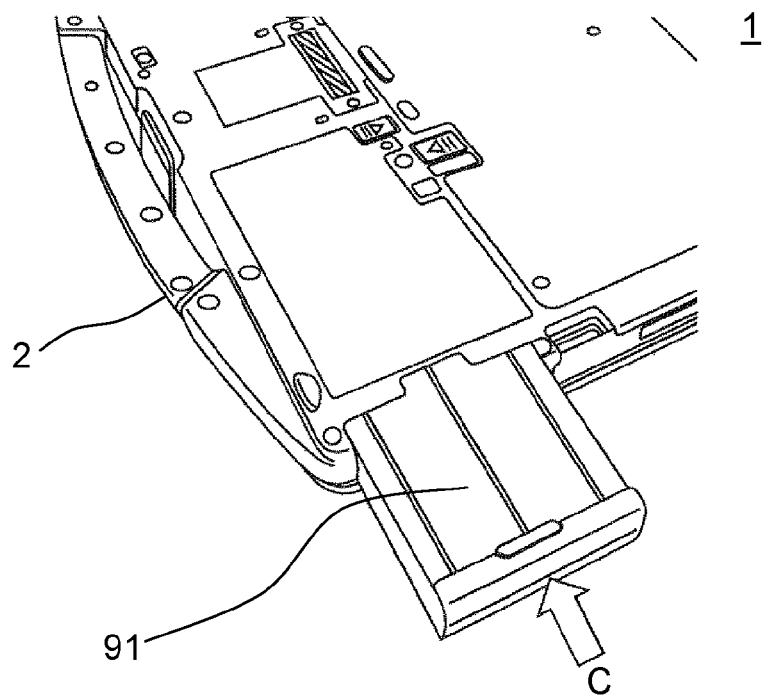
FIG. 3B shows how the first battery is attached to the electronic device according to the first exemplary embodiment.

FIG. 3B shows how first battery 91 is attached to device 1 according to the first exemplary embodiment. The user can easily attach first battery 91 to device 1 by inserting first battery 91 into the slot on the side of body 2 in the direction of the arrow C.

Figure 4A:
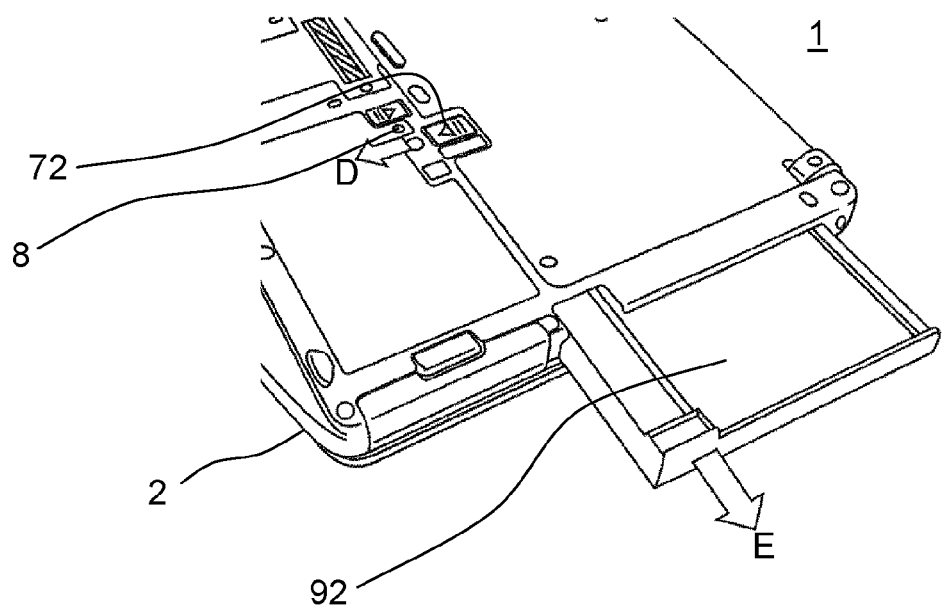
FIG. 4A shows how a second battery is detached from the electronic device according to the first exemplary embodiment.

FIG. 4A shows how second battery 92 is detached from device 1 according to the first exemplary embodiment. The user can easily detach second battery 92 from device 1 by sliding second latch 72 in the direction of the arrow D and then pulling second battery 92 in the direction of the arrow E while keeping second latch 72 in the open state.

Figure 4B:
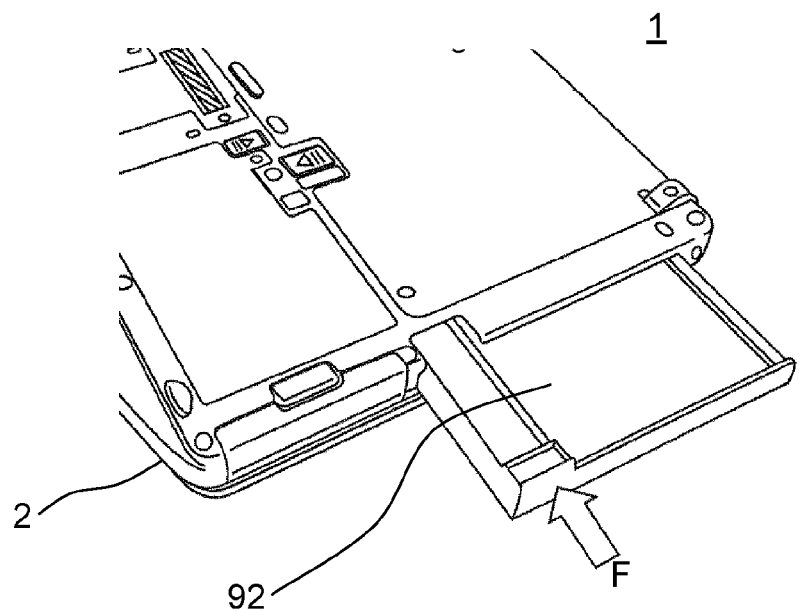
FIG. 4B shows how the second battery is attached to the electronic device according to the first exemplary embodiment.

FIG. 4B shows how second battery 92 is attached to device 1 according to the first exemplary embodiment. The user can easily attach second battery 92 to device 1 by inserting second battery 92 into the slot on the side of body 2 in the direction of the arrow F.

FIG. 5 is a block diagram illustrating the structure of device 1 according to the first exemplary embodiment. Device 1 can use, as its power source, AC adapter 99, first battery 91 attached to first-battery attachment portion 191, second battery 92 attached to second-battery attachment portion 192, and internal battery 93.

First battery 91 is, for example, a secondary battery of 45 Wh, and is a main battery to be preferentially used when device 1 is battery driven. First battery 91 is coupled to a load including power controller 221 via first switch 211 and diode 202. Device 1 can use power from first battery 91 by connecting first switch 211 to first battery 91.

Second battery 92 is, for example, a secondary battery of 33 Wh, and is an auxiliary battery to be used when first battery 91 is not available. Second battery 92 is coupled to the load including power controller 221 via first switch 211 and diode 202. Device 1 can use power from second battery 92 by connecting first switch 211 to second battery 92.

Internal battery 93 is, for example, a secondary battery of 7 Wh, and is a bridge battery to achieve the hot swap function to replace first battery 91 or second battery 92 while device 1 is in operation. Internal battery 93 is coupled to the load including power controller 221 via second switch 212 and diode 203. Device 1 can use power from internal battery 93 by turning on second switch 212. In the present exemplary embodiment, internal battery 93 is not easily detached from the body, but may alternatively be configured to be detachable from the body.

Diode 202 and diode 203 are connected in parallel with the load including power controller 221. In this configuration, when device 1 is driven by batteries, power is supplied to the load from one of diodes 202 and 203 that has a higher potential.

Remaining battery power detector 195 measures the output voltage of each of first battery 91, second battery 92, and internal battery 93, and then determines their remaining amounts of power based on the measurement results. The determination results of remaining battery power detector 195 are sent to power controller 221. In the present exemplary embodiment, the remaining amounts of power of first battery 91, second battery 92, and internal battery 93 are all detected by the single remaining battery power detector 195. Alternatively, however, it is possible to provide a plurality of remaining battery power detectors 195 and to determine the remaining amounts of power of batteries 91, 92, and 93 separately.

Latch state detector 170 determines the open or closed state of each of first latch 71 (cf. FIG. 3A) and second latch 72 (cf. FIG. 4A). Latch state detector 170 sends the determination results to power controller 221. In the present exemplary embodiment, the open or closed state can be determined by any method. In the present exemplary embodiment, the open or closed states of both first latch 71 and second latch 72 are determined by the single latch state detector 170. Alternatively, however, it is possible to provide a plurality of latch state detectors 170 and to determine the open or closed states of first and second latches 71 and 72 separately.

When in the open state, first latch 71 is slid in the direction of the arrow A shown in FIG. 3A so that first battery 91 is free to be attached to or detached from first-battery attachment portion 191. When in the closed state, first latch 71 is not slid in the direction of the arrow A. Therefore, first battery 91 is not free to be detached from first-battery attachment portion 191. Similarly, when in the open state, second latch 72 is slid in the direction of the arrow D shown in FIG. 4A so that second battery 92 is free to be attached to or detached from second-battery attachment portion 192. When in the closed state, second latch 72 is not slid in the direction of the arrow D. Therefore, second battery 92 is not free to be detached from second-battery attachment portion 192.

Battery connection detector 194 determines whether first battery 91 is attached on first-battery attachment portion 191 and whether second battery 92 is attached on second-battery attachment portion 192. Battery connection detector 194 sends the determination results to power controller 221. In the present exemplary embodiment, whether the batteries are attached can be determined by any method. In the present exemplary embodiment, whether first battery 91 and second battery 92 are attached is determined by the single battery connection detector 194. Alternatively, however, it is possible to provide a plurality of battery connection detectors 194 and to determine the presence or absence of attachment of first and second batteries 91 and 92 separately.

Power controller 221 is a processor for controlling the power of device 1, and is, for example, an embedded controller (EC) microcomputer. Power controller 221 receives power from, for example, first battery 91 and distributes it to each component of device 1.

Power controller 221 further controls first switch 211 and second switch 212 based on the determination results of each of remaining battery power detector 195, latch state detector 170, and battery connection detector 194. In other words, power controller 221 switches the power supplier between first battery 91, second battery 92, and internal battery 93. The control of first and second switches 211 and 212 by power controller 221 enables battery replacement (hot swap function) while device 1 is in operation, and further enables automatic switching of the power supplier from first battery 91 as the main battery to second battery 92 as the auxiliary battery.

Power controller 221 further controls the power of each of display 3, display controller 231 for controlling display 3, and central processing unit (CPU 241). Display controller 231 is a circuit for controlling the power consumption and display operation of display 3 under the control of power controller 221 and CPU 241. Display 3 for displaying information is, for example, a liquid crystal display.

CPU 241, which controls the entire device 1, executes the operating system and the application software programs stored in the unillustrated storage unit so as to provide the user with various functions.

Device 1 further includes light-emitting-diode controller (hereinafter, LED controller) 251, which is a circuit for controlling the on-off and display colors of LED 8 under the control of power controller 221. LED 8 is a light emitting diode capable of emitting a plurality of colors (e.g., red and green).

Power controller 221 further controls the on-off and luminous colors of LED 8 by controlling LED controller 251 based on the determination results of each of remaining battery power detector 195, latch state detector 170, and battery connection detector 194. More specifically, when latch state detector 170 determines that at least one of first latch 71 and second latch 72 is opened, power controller 221 determines whether first battery 91 and second battery 92 are free to be detached while device 1 is in operation, based on the determination results of each of remaining battery power detector 195 and battery connection detector 194. Power controller 221 then informs the user of the determination results via LED 8.

FIG. 6 shows reference table 222 of LED lighting.

Reference table 222 is referred to by power controller 221 to control the on-off and luminous colors of LED 8. Reference table 222 is stored in a storage circuit. In the present exemplary embodiment, the structure of the storage circuit is not limited to a specific one, and reference table 222 may be included in power controller 221.

Reference table 222 manages internal-battery information 222a, which indicates whether internal battery 93 can supply power to device 1. Reference table 222 further manages first-battery information 222b and second-battery information 222c. First-battery information 222b indicates whether first battery 91 can supply power to device 1, and second-battery information 222c indicates whether second battery 92 can supply power to device 1.

Internal-battery information 222a manages the remaining power in internal battery 93 by classifying it as either "No" or "Yes". The term "No" indicates that the remaining power in battery 93 is zero (or almost zero), or in other words, that the ratio of the remaining power to the capacity of battery 93 is a predetermined percentage or less. Meanwhile, "Yes" indicates that the remaining power in battery 93 is not zero (or not almost zero), or in other words, that the ratio of the remaining power to the capacity of battery 93 exceeds the predetermined percentage.

First-battery information 222b manages the remaining power in first battery 91 by classifying it as either "No" or "Yes". The term "No" indicates the following two states. One state is that battery 91 is attached on first-battery attachment portion 191 but its remaining power is zero (or almost zero), or in other words, that the ratio of the remaining power to the capacity of battery 91 is a predetermined percentage or less. The other state is that battery 91 is not attached on first-battery attachment portion 191. Meanwhile, "Yes" indicates that battery 91 is attached on first-battery attachment portion 191 and its remaining power is not zero (or not almost zero), or in other words, that the ratio of the remaining power to the capacity of battery 91 exceeds the predetermined percentage.

Second-battery information 222c manages the remaining power in second battery 92 by classifying it as either "No" or "Yes". The term "No" indicates the following two states. One state is that battery 92 is attached on second-battery attachment portion 192 but its remaining power is zero (or almost zero), or in other words, that the ratio of the remaining power to the capacity of battery 92 is a predetermined percentage or less. The other state is that battery 92 is not attached on second-battery attachment portion 192. Meanwhile, "Yes" indicates that battery 92 is attached on second-battery attachment portion 192 and its remaining power is not zero (or not almost zero), or in other words, that the ratio of the remaining power to the capacity of battery 92 exceeds the predetermined percentage.

Reference table 222 further manages first latch information 222d and second latch information 222e. First latch information 222d indicates the ON state of LED 8 when first latch 71 is opened. Second latch information 222e indicates the ON state of LED 8 when second latch 72 is opened. Reference table 222 further manages first/second latch information 222f, which indicates the ON state of LED 8 when both first latch 71 and second latch 72 are opened.

First latch information 222d indicates the ON state of LED 8 when first latch 71 is opened.

Second latch information 222e indicates the ON state of LED 8 when second latch 72 is opened.

First and second latch information 222f indicates the ON state of LED 8 when both first latch 71 and second latch 72 are opened.

In first latch information 222d, second latch information 222e, and first/second latch information 222f, the "turn off" indicates that LED 8 should be turned off. The "continuous green", which is a first ON state, indicates that LED 8 should be continuously lit green. The "flashing red", which is a second ON state, indicates that LED 8 should be flashed red.

The "turn off" of first latch information 222d indicates that device 1 is not in operation, and that opening first latch 71 does not affect device 1. The "continuous green" of first latch information 222d indicates that opening first latch 71 and then detaching first battery 91 from device 1 in operation does not cause device 1 to halt. The "flashing red" of first latch information 222d indicates that opening first latch 71 and then detaching first battery 91 from device 1 in operation causes device 1 to halt.

Similarly, the "turn off" of second latch information 222e indicates that device 1 is not in operation, and that opening second latch 72 does not affect device 1. The "continuous green" of second latch information 222e indicates that opening second latch 72 and then detaching second battery 92 from device 1 in operation does not cause device 1 to halt. The "flashing red" of second latch information 222e indicates that opening second latch 72 and then detaching second battery 92 from device 1 in operation causes device 1 to halt.

Similarly, the "turn off" of first/second latch information 222*f* indicates that device 1 is not in operation, and that opening both first latch 71 and second latch 72 does not affect device 1. The "continuous green" of first/second latch information 222*f* indicates that opening both first latch 71 and second latch 72 and then detaching first battery 91 and/or second battery 92 from device 1 in operation does not cause device 1 to halt. The "flashing red" of first/second latch information 222*f* indicates that opening both first latch 71 and second latch 72 and then detaching first battery 91 and/or second battery 92 from device 1 in operation causes device 1 to halt.

When latch state detector 170 determines that at least one of first latch 71 and second latch 72 is opened, power controller 221 recognizes the state (the above-described "No" or "Yes") of each of internal battery 93, first battery 91, and second battery 92 based on the determination results of remaining battery power detector 195 and battery connection detector 194. Power controller 221 then refers to reference table 222 to check internal-battery information 222*a*, first-battery information 222*b*, and second-battery information 222*c*, and specifies the row corresponding to the recognized states. Power controller 221 then obtains, from the specified row, the information in the column corresponding to the latch whose opening has been determined by latch state detector 170. Hence, power controller 221 specifies the color and state (lighting or flashing) in which LED 8 should be displayed when latch state detector 170 determines that the latch is opened.

1-2. Operation

Figure 7:
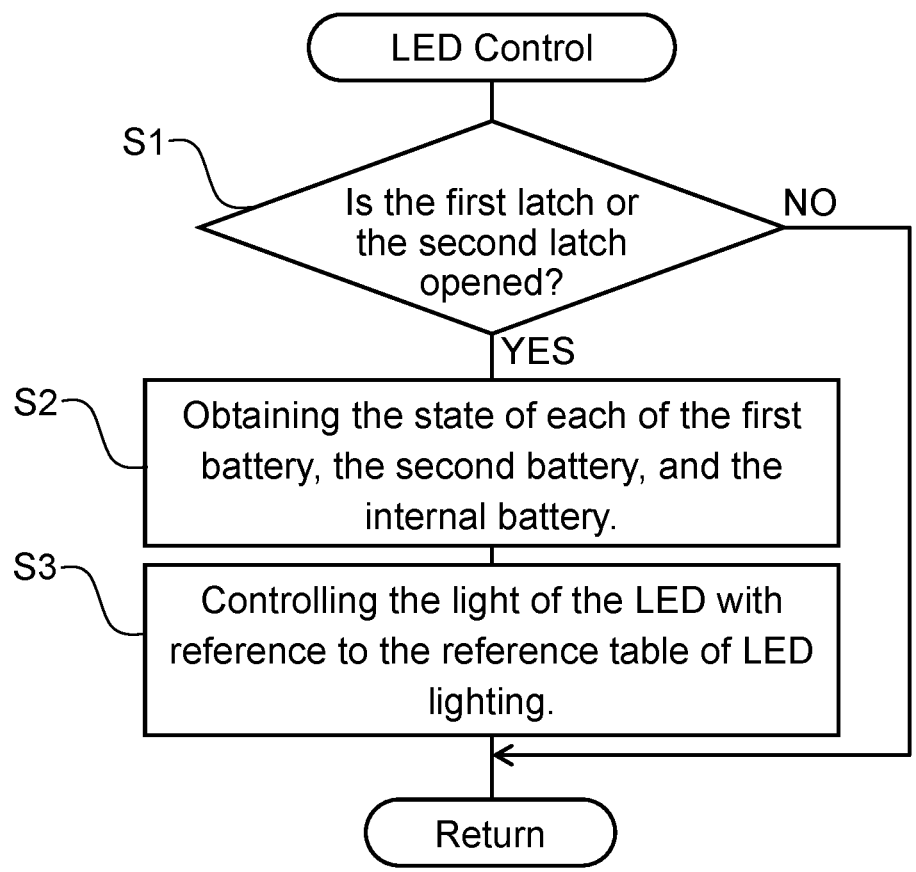
FIG. 7 is a flowchart showing LED control in the electronic device according to the first exemplary embodiment.

The operation of electronic device 1 will now be described with reference to the flowchart of FIG. 7. FIG. 7 is a flowchart showing the LED lighting control performed by power controller 221. The process shown in the flowchart of FIG. 7 is performed by power controller 221 executing a predetermined program. Power controller 221 can repeatedly execute the process shown in FIG. 7 whenever necessary.

Power controller 221 determines based on the determination results of latch state detector 170 whether at least one of first latch 71 and second latch 72 is opened (Step S1). When the determination is affirmative ("Yes" in Step S1, the process goes to Step S2.

In Step S2, power controller 221 obtains the state of each of first battery 91, second battery 92, and internal battery 93 based on the determination results of battery connection detector 194 and of remaining battery power detector 195.

Power controller 221 then refers to reference table 222 to specify the row corresponding to the states of first battery 91, second battery 92, and internal battery 93 obtained in Step S2. Power controller 221 specifies the column corresponding to the determination results of latch state detector 170 within the specified row, and obtains information about the ON state of LED 8. Power controller 221 then lights LED 8 based on the obtained information about its ON state (Step S3).

A specific example of the lighting control of LED 8 will now be described as follows.

Assume that latch state detector 170 determines that first latch 71 is opened (second latch 72 is in the closed state). Also assume that battery connection detector 194 determines that first battery 91 and second battery 92 are in the attached state. Also assume that remaining battery power detector 195 determines that the remaining power in first battery 91 is zero (or almost zero), or in other words, that the ratio of the remaining power to the capacity is the predetermined percentage or less, and that the remaining power in second battery 92 is enough to drive device 1 (the ratio of the remaining power to the capacity exceeds the predetermined percentage). Also assume that remaining battery power detector 195 determines that the remaining power in internal battery 93 is zero (or almost zero), or in other words, that the ratio of the remaining power to the capacity is the predetermined percentage or less.

In this case, power controller 221 determines that the states of internal battery 93, first battery 91, and second battery 92 are "No", "No", and "Yes", respectively. These states correspond to the second row in reference table 222 shown in FIG. 6. Power controller 221 then obtains the information ("continuous green" as the first ON state) in the specified row of first latch information 222*d*.

Power controller 221 then makes LED 8 light green through LED controller 251.

In this case, first latch 71 is open, and the remaining power in second battery 92 is sufficient. First latch 71 is considered to be opened to prepare for the detachment of first battery 91. However, since the remaining power in second battery 92 is sufficient, even if first battery 91 is detached, device 1 can continue to be operated by connecting first switch 211 to second battery 92. In short, first battery 91 can be replaced while device 1 is in operation. Therefore, power controller 221 makes LED 8 light green to inform the user that first battery 91 can be hot swapped.

Alternatively, assume that latch state detector 170 determines that second latch 72 is opened (first latch 71 is in the closed state). In the same manner as the former example, also assume that battery connection detector 194 determines that first battery 91 and second battery 92 are in the attached state. Also assume that remaining battery power detector 195 determines that the remaining power in first battery 91 is zero (or almost zero), or in other words, that the ratio of the remaining power to the capacity is the predetermined percentage or less; that the remaining power in second battery 92 is enough to drive device 1 (the ratio of the remaining power to the capacity exceeds the predetermined percentage); and that the remaining power in internal battery 93 is zero (or almost zero), or in other words, that the ratio of the remaining power to the capacity is the predetermined percentage or less.

In this case, power controller 221 determines that the states of internal battery 93, first battery 91, and second battery 92 are "No", "No", and "Yes", respectively. These states correspond to the second row in reference table 222 shown in FIG. 6. Power controller 221 then obtains the information ("flashing red" as the second ON state) in the specified row of second latch information 222*e*.

Power controller 221 then makes LED 8 flash red through LED controller 251.

In this case, second battery 92 has sufficient remaining power, and second latch 72 for locking second battery 92 is in the open state. Second latch 72 is considered to be opened to prepare for the detachment of second battery 92. However, second battery 92 is the only battery with sufficient remaining power, and device 1 cannot be supplied with power from first battery 91 or internal battery 93. Therefore, if second battery 92 is detached in such circumstances, device 1 becomes inoperative. In other words, second battery 92 is not free to be replaced while device 1 is in operation. Hence, power controller 221 makes LED 8 flash red to warn the user that second battery 92 cannot be hot swapped. As a result, after opening second latch 72, the user can decide not to detach second battery 92, thereby preventing device 1 from halting.

Alternatively, assume that latch state detector 170 determines that both first latch 71 and second latch 72 are opened. In the same manner as the former example, also assume that battery connection detector 194 determines that first battery 91 and second battery 92 are in the attached state. Also assume that remaining battery power detector 195 determines that the remaining power in first battery 91 is zero (or almost zero), or in other words, that the ratio of the remaining power to the capacity is the predetermined percentage or less, and that the remaining power in second battery 92 is enough to drive device 1 (the ratio of the remaining power to the capacity exceeds the predetermined percentage). Also assume that remaining battery power detector 195 determines that the remaining power in internal battery 93 is zero (or almost zero), or in other words, that the ratio of the remaining power to the capacity is the predetermined percentage or less.

In this case, power controller 221 determines that the states of internal battery 93, first battery 91, and second battery 92 are "No", "No", and "Yes", respectively. These states correspond to the second row in reference table 222 shown in FIG. 6. Power controller 221 then obtains the information ("flashing red" as the second ON state) in the specified row of first/second latch information 222f.

Power controller 221 then makes LED 8 flash red through LED controller 251.

In this case, first battery 91 has no remaining power, and second battery 92 has sufficient remaining power, and both first latch 71 and second latch 72 for locking first and second batteries 91 and 92, respectively, are in the open state. Both latches 71 and 72 are considered to be opened to prepare for the detachment of both first and second batteries 91 and 92. However, second battery 92 is the only battery with sufficient remaining power, and device 1 cannot be supplied with power from internal battery 93. Therefore, if first battery 91 and second battery 92 are detached in such circumstances, device 1 becomes inoperative. In other words, first battery 91 and second battery 92 are not free to be detached together while device 1 is in operation. Hence, power controller 221 makes LED 8 flash red to warn the user that first battery 91 and second battery 92 cannot be hot swapped together. As a result, after opening first latch 71 and second latch 72, the user can decide not to detach first battery 91 and second battery 92 together, thereby preventing device 1 from halting.

The description given so far shows how power controller 221 determines the states of internal battery 93, first battery 91, and second battery 92 to be "No", "No", and "Yes", respectively, depending on the latch to be opened. When the states of internal battery 93, first battery 91, and second battery 92 are not "No", "No", and "Yes", respectively, the basic operations are identical to those in the above-described example. Therefore, a detailed description is omitted.

The basic principle of power controller 221 is as follows. When the battery corresponding to an opened latch is detached, if any of the remaining batteries can supply power, controller 221 makes LED 8 light green as the first ON state, thereby informing the user that the hot swap function is available. Meanwhile, if the remaining batteries cannot supply power, controller 221 makes LED 8 flash red as the second ON state, thereby informing the user that the hot swap function is not available.

1-3. Effects

Electronic device 1 according to the present exemplary embodiment can carry three batteries: first battery 91, second battery 92, and internal battery 93, and has one LED 8 for informing the user whether first battery 91 and second battery 92 can be hot swapped. First, device 1 determines that first latch 71 and second latch 72 for locking first battery 91 and second battery 92, respectively, are opened. Device 1 then determines whether it can continue to operate after the detachment of the battery locked by the latch that is determined to be open. Device 1 then makes LED 8 light green or flash red, depending on the determination so as to inform the user whether this battery is free to be detached. As a result, the user can be informed whether the battery locked by the latch is free to be detached at the moment when the user tries to open the latch. This prevents device 1 from halting, which may be caused by the detachment of a battery.

The first exemplary embodiment described so far is an example of the present disclosure. The present disclosure is not limited to this embodiment, and is applicable to other embodiments obtained by applying modification, replacement, addition, or omission to the first exemplary embodiment.

In the first exemplary embodiment, electronic device 1 can carry three batteries: first battery 91, second battery 92, and internal battery 93. Alternatively, however, device 1 can carry three or more batteries.

In the first exemplary embodiment, the controller is an EC microcomputer, but may alternatively be any device that controls the on-off of LED 8.

In the first exemplary embodiment, device 1 includes battery connection detector 194. However, detector 194 is not an essential component because the same results as in the first exemplary embodiment can be obtained without referring to reference table 222 to check whether a battery is in the attached state. When a battery is not in the attached state, the determination results of remaining battery power detector 195 indicate that the remaining power is zero. Therefore, even if reference table 222 is referred to by using the determination results of remaining battery power detector 195 alone, the results are the same as in the first exemplary embodiment. However, it goes without saying that using the determination results of battery connection detector 194 improves the accuracy of the battery state to be obtained.

Thus, the present disclosure has been described in detail by taking the exemplary embodiment as its example with reference to the accompanying drawings.

Note that some of the components described in detail and shown in the accompanying drawings are not essential components for the present disclosure, and should not be regarded as essential components just because they are described in detail and shown in the accompanying drawings.

The above-described exemplary embodiment is just an example of the present disclosure, and the present disclosure is susceptible to modification, replacement, addition, or omission within the scope of the present disclosure and its equivalents.

Hence, the present disclosure is applicable to an electronic device that can be powered by batteries.

REFERENCE MARKS IN THE DRAWINGS 1 electronic device
2 body
3 display
4 keyboard
5 pointing device
8 LED (light emitting diode)
71 first latch
72 second latch
91 first battery 92 second battery
93 internal battery
170 latch state detector
191 first-battery attachment portion
192 second-battery attachment portion
194 battery connection detector
195 remaining battery power detector
201, 202, 203 diode
211 first switch
212 second switch
221 power controller
222 reference table of LED lighting
222*a* internal-battery information
222*b* first-battery information
222*c* second-battery information
222*d* first latch information
222*e* second latch information
222*f* first/second latch information
231 display controller
241 CPU (central processing unit)
251 LED controller (light-emitting-diode controller)

The invention claimed is:

1. An electronic device comprising:
a first attachment portion to which a first battery is detachably attachable;
a second attachment portion to which a second battery is detachably attachable;
an internal battery;
a first latch configured to lock the first battery attached on the first attachment portion;
a second latch configured to lock the second battery attached on the second attachment portion;
a latch state detector configured to detect whether each of the first latch and the second latch is open or closed;
a remaining battery power detector configured to determine remaining power in each of the first battery, the second battery, and the internal battery;
a light emitting diode; and
a light-emitting-diode controller configured to control on-off of the light emitting diode, wherein
when the latch state detector determines that the first latch is opened, the light-emitting-diode controller operates as follows based on determination results of the remaining battery power detector:
if at least one of the second battery and the internal battery can supply electric power to the electronic device, the light-emitting-diode controller makes the light emitting diode light in a first ON state, and
if neither the second battery nor the internal battery can supply electric power to the electronic device, the light-emitting-diode controller makes the light emitting diode light in a second ON state,
when the latch state detector determines that the second latch is opened, the light-emitting-diode controller operates as follows based on the determination results of the remaining battery power detector:
if at least one of the first battery and the internal battery can supply electric power to the electronic device, the light-emitting-diode controller makes the light emitting diode light in the first ON state, and
if neither the first battery nor the internal battery can supply electric power to the electronic device, the light-emitting-diode controller makes the light emitting diode light in the second ON state,
when the remaining battery power detector determines that a ratio of the remaining power in the first battery to a capacity of the first battery is larger than a predetermined value, the light-emitting-diode controller determines that electric power can be supplied to the electronic device from the first battery,
when the remaining battery power detector determines that a ratio of the remaining power in the second battery to a capacity of the second battery is larger than a predetermined value, the light-emitting-diode controller determines that electric power can be supplied to the electronic device from the second battery, and
when the remaining battery power detector determines that a ratio of the remaining power in the internal battery to a capacity of the internal battery is larger than a predetermined value, the light-emitting-diode controller determines that electric power can be supplied to the electronic device from the internal battery.

2. The electronic device according to claim 1, wherein the first ON state is continuous lighting of a first color, and the second ON state is a flash of a second color different from the first color.

* * * * *